UNITED STATES PATENT OFFICE.

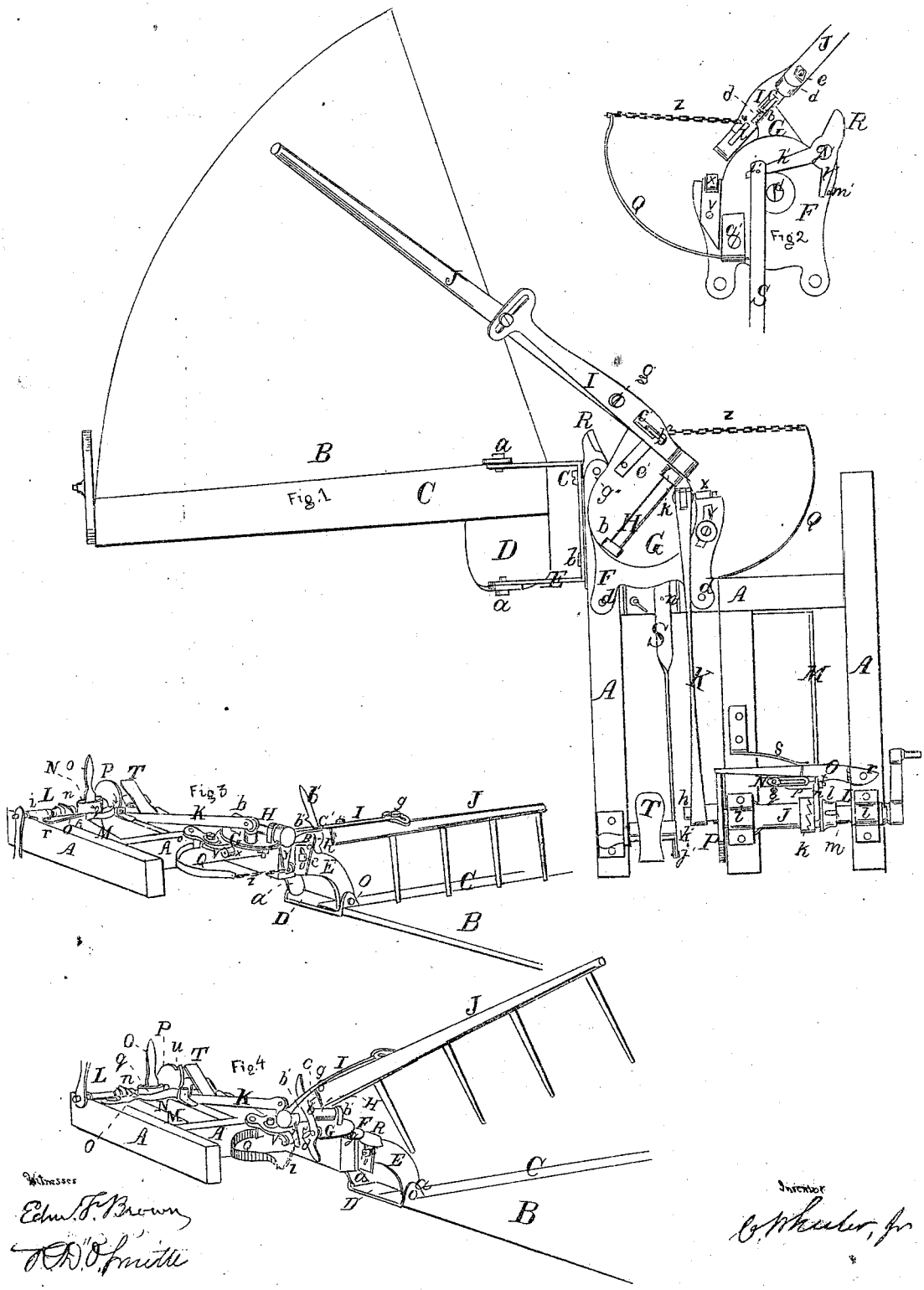
C. Wheeler, Jr.
Harvester Rake.
No. 42,521
Patented April 26, 1864

CYRENUS WHEELER, JR., OF POPLAR RIDGE, NEW YORK.

IMPROVEMENT IN RAKING ATTACHMENTS TO HARVESTERS.

Specification forming part of Letters Patent No. 42,521, dated April 26, 1864.

*To all whom it may concern:*

Be it known that I, CYRENUS WHEELER, Jr., of Poplar Ridge, in the county of Cayuga and State of New York, have invented new and useful Improvements in Raking Attachments for Harvesters; and I hereby declare that the following is a full and exact description thereof, reference being had to the accompanying drawings, and to the letters of reference marked thereon, in which—

Figure 1 represents a top or plan view of main frame, platform, finger-bar, and its connections with the main frame, with the raking attachment mounted thereon and connected therewith. Fig. 2 represents a plan view of a portion of the rake and its attachments and supports, bottom side up. Fig. 3 represents, by a perspective view, the attachment with the rake-teeth resting on the table. Fig. 4 is a perspective view of the same with the rake elevated above the platform.

The same letters, where they occur in the several figures, indicate like parts of the machine.

The invention consists in so mounting on the main frame a rake that has a reciprocating motion in the arc of a circle that it shall follow the surface of a platform hinged to the main frame; also, in combining a spring with the rake, so as to give it sufficient force to carry the rake-teeth through the grain and hold it firmly to the platform till the grain is partly removed, its force being entirely exhausted before the elevating devices of the rake act; also, in combining with the rake devices for dropping the rake to the platform, that are under the control of the operator, and devices that throw the rake out of gear, that are self-acting.

A is the main frame of the machine; B, the platform for receiving the grain as cut. C is the finger-bar; D, the shoe to which the finger-bar is connected; E, coupling-piece for connecting the finger-bar and shoe to the main frame. This coupling-piece pivots to shoe D by pivot-bolts $a$, forming a hinge, and to the main frame A by pivot-bolt $b$, thus giving the finger-bar two hinged connections at right angles to each other. To restrain the coupling-piece E in its motions and fix it in any position desired, bolt $c$ is provided.

On the main frame A is fastened bed-plate F by means of bolts $d$. On this is pivoted plate G by means of pivot-bolt E, being thus left free to turn on bed-plate F. Plate G carries bearings $f$, which support rock-shaft H. To this rock-shaft is fastened one end of arm I, to which is fastened one end of rake J by bolt $g$. In order to give plate G a reciprocating motion around the axis of its pivot-bolt $e$, it is connected to crank-pin $h$ by connecting-rod K, motion being given to the crank by shaft L, which is supported on the main frame A by suitable bearings, $i$. The shaft L is in two parts, that marked $j$ being bored out so as to form a tubular sleeve, in which the other part is free to revolve. On the end of $j$ is formed a clutch-piece, $k$, the other part of the shaft L carrying a corresponding clutch-piece, $l$, which is free to slide longitudinally within certain limits, but is restrained from revolving independent of the shaft by pin $m$.

To the main frame A is fastened one end of spring M, the other end having a fork-piece, $n$, that embraces clutch-piece $l$. A stand, $m$, is fastened to the main frame, and has a lever, $o$, pivoted to it, the upper end of the stand M serving as a guide for the lever. This lever $o$ is connected to the fork-piece $n$ by a short rod, $p$. The stand M and lever $o$ have holes for inserting pin $q$.

To the main frame A, by pivot-bolt $r$, is pivoted catch-piece O, which has a spring, $s$, pressing against it. The catch-piece O has a projection, $t$, which falls in behind the fork-piece $n$, when the clutch-piece $l$ is brought up to its fellow clutch-piece $k$ and prevents the recoil of the spring M from throwing the clutch-piece $l$ back from its fellow $k$. On crank-head P is a cam-projection, $u$.

To bed-plate F is fastened a stop-piece, $v$, which is adjustable. This stop has a friction-roller, $x$.

Rock-shaft H has a projecting piece, $y$, extending down nearly at right angles to arm I. To the lower end of this projection is fastened chain $z$, the other end of which is fastened to the spring Q, the other end of the spring Q being fastened at $a'$ to the bed-plate F.

To plate G is pivoted catch-piece $b'$, the lower end of which extends below the plate G, its upper end passing through a hole, $c'$, in arm I. This catch-piece has a ledge, $d'$, on which spring $e'$ presses. This catch-piece has also a lip, f', which takes under the arm I when the rake is elevated and holds it in its elevated position.

To the lower side of the bed-plate F is pivoted stop R by pivot-bolt g'. The arm h' of the stop is pivoted at i to one end of connecting-rod S, the other end of the rod being pivoted at j to the foot-lever or treadle T, this treadle being pivoted to the main frame A by stud k'. Stop R has an arm, l', which controls the vibrations of the stop in its outward motion by striking against pin m' in bed-plate F. The connecting-rod S has a hole, n', in it for inserting a pin, a corresponding hole being made in the main frame.

Having described its construction, I will now describe its operation, which is as follows: First insert a pin in the hole n' of connecting-rod S and its corresponding hole in the main frame, which will bring the arm l' of the stop R against the pin m' and retain the stop R in a fixed position. Then move the top of the lever o so as to bring the catch l to its fellow and permit the projection t of the catch-pin O to slide behind the fork-piece n' and hold the clutch l to its fellow k. The revolution of the shaft L causes the crank-head P to revolve in the direction of the arrow, Figs. 3 and 4, giving a reciprocating motion to plate G by means of the connecting-rod K, the movement of the plate G giving a corresponding movement to the rake J and its connections mounted thereon, embracing in its movement an arc of about one-fourth of a circle. The rake, starting from its elevated position, as shown in Fig. 4, is carried over the platform till the lower end of catch-piece b' strikes the stop R, which, by throwing back the catch, releases the rake, permitting it to drop upon the platform, as seen at Fig. 3, where it is shown with the point of its teeth resting upon the table near the finger-bar. In the movement of the rake across the table the teeth follow very closely the surface of the table, the movement of the table on its hinged connection with the main frame not interfering with the effective practical operation of the rake in sweeping the grain from the table, the spring Q, by its recoil, serving to force the teeth of the rake through the grain and hold them firmly to the table during the first half of the movement of the rake, thereby preventing the teeth from slipping over the grain. After moving the grain about one-half of the circuit the recoil of the spring is exhausted and the chain z becomes slackened, the weight of the rake and its connections being sufficient to complete the delivery of the grain, which is laid at nearly right angles to the position outside of the path of the cutting apparatus, leaving room for the team in the succeeding swath. As the rake J leaves the table the projection y of the rock-shaft H strikes the friction-roller x of the stop v and the rake is elevated, as seen in Fig. 4. The recoil of the spring Q having been previously exhausted, power sufficient to raise the rake and its connection is only required, the catch-piece b' holding it in its elevated position. Immediately after the rake is elevated the cam-projection u of the crank-head P strikes the end of the catch-piece O, carries it back, and releases it from the fork-piece n, the spring M moving the clutch l, so as to disconnect it from its fellow and stop the crank-head P and the rake, which is left in an elevated position, where it will remain till the advance of the machine has gathered sufficient grain for another sheave, where the operator, who may ride on a seat mounted on the machine, can again, by means of the leaver O, bring the clutch together, when the rake will again perform the movements previously described, again stopping after removing the grain from the table. Another method of operation is to bring the clutches together and hold them together by inserting pin q in holes of stand N and lever O, so that the clutches will not be thrown out of gear by the cam u throwing back catch-piece O. When thus arranged the rake will continue to make its movements without stopping, removing the grain at uniform distances. Another method is to remove the pin from the hole n' of connecting-rod S. When thus arranged the stop R, being left free, offers no resistance to the catch-piece b', and the rake will continue to vibrate back and forth in its elevated position above the grain without dropping on the platform. To bring the rake down upon the platform, the operator presses down the rear of the lever or treadle T, which brings the stop R into its proper position to throw back the catch-piece b' and drop the rake, the movement being repeated by the operator as often as sufficient grain has accumulated on the platform to form a bundle.

It will be seen by an examination of the drawings that the rock-shaft H serves as a hinge for the rake J, which rises and falls in radial lines of which said shaft is the center, by which means the rake follows closely the varying positions of the platform, which are shown by red lines in Figs. 3 and 4. It will also be seen that the pivoted center of the rake in its horizontal movement is not in the same plane in which the rake rises and falls, but is placed at one side of it, giving the rake in its movements across the platform a drawing stroke.

Having thus fully described my invention and its mode of operation, what I claim as my invention, and desire to secure by Letters Patent, is—

1. In combination with a platform having a hinged connection with the main frame, so connecting the rake to vibrating plate G and mounting it on plate F, rigidly connected to the main frame, that the rake, in sweeping across the platform, shall follow its surface and deliver the grain in the rear of the main frame, and in a position nearly at right angles to that in which it falls upon the platform, substantially as described.

2. In combination with the rake, spring Q and chain z, so arranged as to give the rake increased force as it falls and hold it firmly to the platform during the first part of its sweep, substantially as described.

3. In combination with the catch-piece $b'$, for sustaining the rake when elevated, the stop R, controlled by the operator for releasing rake at pleasure, substantially as described.

4. The combination and arrangement of the self-acting devices for throwing the rake out of gear and stopping it in an elevated position after removing the grain, substantially as described.

5. The combination of the device for stopping the movements of the rake with device for releasing the catch-piece $b'$, which supports the rake when elevated, when so arranged as to be under the control of the operator, substantially as described.

C. WHEELER, JR.

Witnesses:
EDM. F. BROWN,
R. D. O. SMITH.